May 15, 1934.    P. K. MADISON ET AL    1,959,273
BASKET HANDLE
Filed Oct. 27, 1932
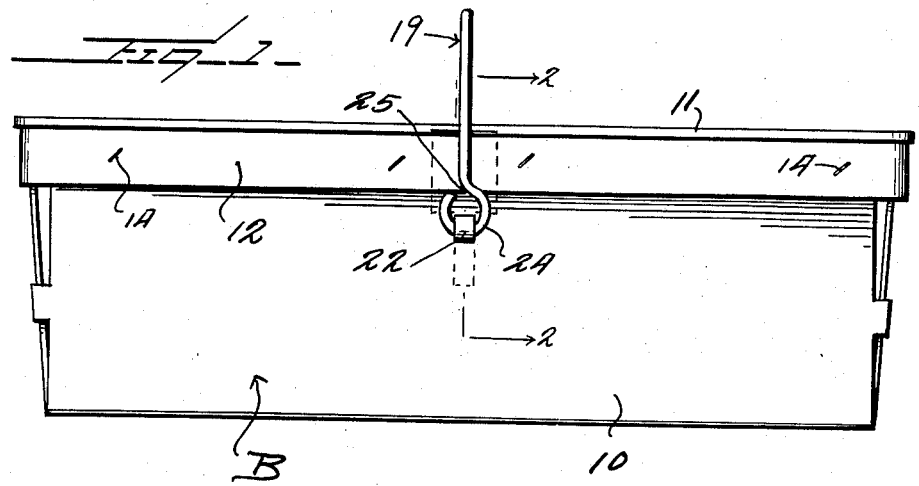
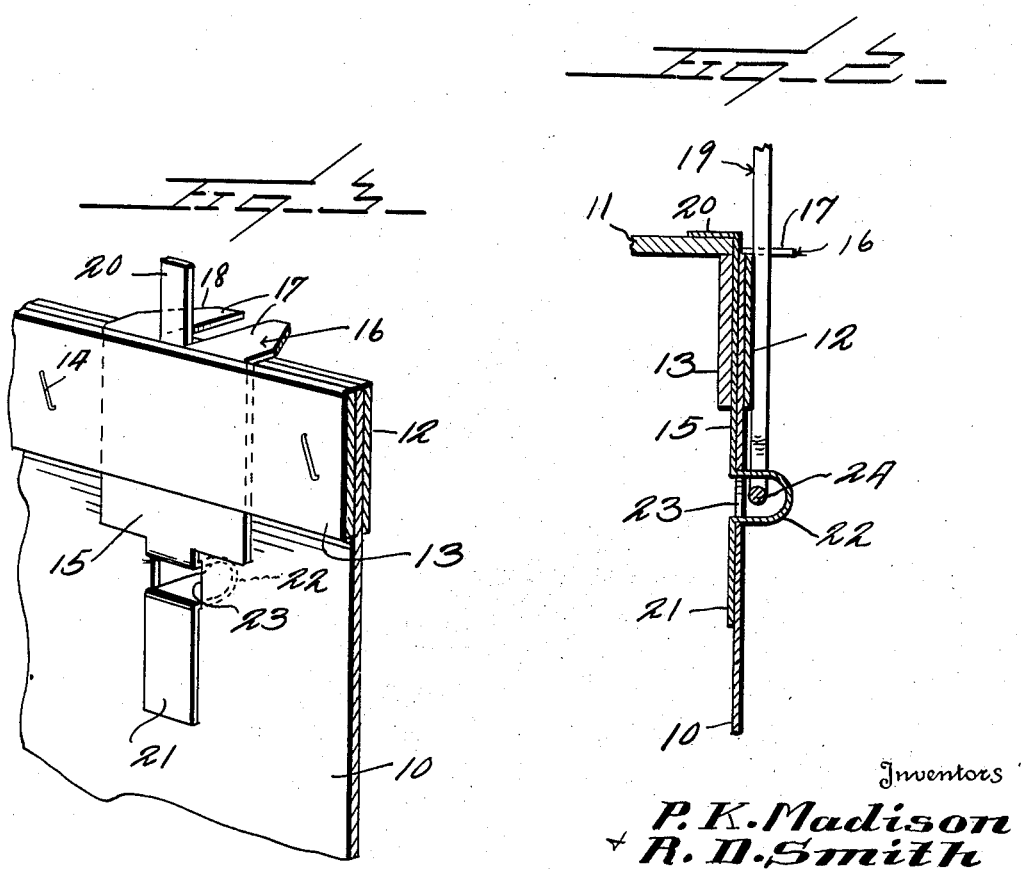
Inventors
P. K. Madison
R. D. Smith
By Watson E. Coleman
Attorney Patented May 15, 1934

1,959,273

UNITED STATES PATENT OFFICE 1,959,273

BASKET HANDLE

Peter K. Madison, Oak Harbor, and Ralph D. Smith, Helena, Ohio

Application October 27, 1932, Serial No. 639,893

3 Claims. (Cl. 217—125)

This invention relates to baskets and more particularly to a basket of the veneer type for use in the handling of fruit or the like.

An object of this invention is to provide a detachable handle for a basket of this type which is so constructed that it will readily stand up so as to permit the carrying of the basket thereby, or it can be swung toward the cover or upper edge of the basket so that a number of baskets can be superposed one on top of the other.

Another object of this invention is to provide a handle construction of this type which can be used with a basket of fiber board or the like and which embodies a construction such that it will not tear out of the side walls of the basket and does not require the use of additional securing means in order to secure or attach the handle to the basket.

A further object of this invention is to provide a handle construction of this kind including means for fastening the cover without the use of nails, clips or the like.

The above and various other objects and advantages of this invention will in part be described and in part be understood from the following detailed description of the present preferred embodiment, the same being illustrated in the accompanying drawing, wherein:—

Figure 1 is a detail side elevation of a basket having a handle constructed according to the preferred embodiment of this invention mounted thereon.

Figure 2 is a fragmentary sectional view taken on the line 2—2 of Figure 1.

Figure 3 is an enlarged fragmentary perspective view showing the handle attaching means mounted on one side wall of the basket.

Referring to the drawing wherein like characters of reference designate corresponding parts throughout the several views, the letter B designates generally a basket construction including side walls 10 and a top or cover 11. The side wall 10, in the present instance, is constructed of veneer or fiber board and has secured to the upper edge thereof, an outer reinforcing strip 12, and an inner reinforcing strip 13. These strips 12 and 13 are secured to the side wall 10 as by clips or staples 14, or the like.

A plate 15 is interposed between the inner reinforcing strip 13 and the inside surface of the side wall 10, and this plate 15 has an outwardly extending bail or handle engaging member, generally designated as 16. This handle or bail engaging member 16 comprises a pair of outstanding lugs 17 which have outwardly converging edge portions 18. These lugs 17 are spaced apart a distance substantially equal to the thickness of a U-shaped handle or bail 19. An upstanding cover securing lug or clip 20 is formed with the plate 15 and initially is disposed in alinement with the plate 15. After the cover 11 has been mounted on top of the basket B, the clips or cover securing member 20 are bent inwardly so as to frictionally hold the cover 11 against movement on the upper edge of the basket B.

A downwardly extending bar 21 is integral with the plate 15 and has formed therewith a U-shaped bail engaging member or pivot 22, which extends outwardly through an opening 23 provided in the side wall 10. The parallel legs of the bail 19 are provided with an open loop or eye 24, which engages this loop 22, and this loop 22 is disposed directly below the space between the outstanding bail supporting lugs or members 17. The space 25 between the free end of the loop or eye 24 and the lower end of the parallel leg of the bail 19 is sufficient such that when the bail 19 is swung downwardly toward the top 11, the bail 19 upon substantially engaging the top 11 can be moved in a horizontal plane and the loop or eye 24 disengaged from the pivotal member 22. That portion of the bar 21 extending below the pivotal member 22 constitutes a bracing means so as to provide a brace within the interior of the side wall 10 to prevent tearing out of the loop 22 and to eliminate the necessity of securing the loop 22 by clips, staples or the like, to the side wall 10. The opening 23 through which the loop 22 extends also provides means whereby the plate 15 is held against horizontal and vertical movement relative to the side wall 10.

In the use of the handle construction herein disclosed, the handle is held in a vertical position, or in a position at right angles to the upper edge of the basket B, by being disposed in the space between the two outstanding arms 17. The handle may be positioned between these arms by compressing the side walls 10 and by providing the inclined opposite edge portions 18, the handle will readily ride over the edge of the arm 17, so that it can be readily mounted between the pair of arms 17.

Where it is desired to stack a number of these baskets one upon the other, the handle or bail 19 can be rocked in the direction opposite to the open portion 25 of the loop or eye 24. Where it is desired to remove the handle or bail 19, the bail can be rocked on the side of the opening 25, and when the upper portion or bight of the bail 19 substantially engages the top 11, the bail can be moved in a horizontal plane so that the free end of the loop 24 will be disengaged from the loop 22. The cover 11 can be secured on top of the basket B by bending the clips or lugs 20 inwardly, and when it is desired to remove the cover from the basket, the clips 20 can be bent upwardly a sufficient distance to release the cover from the two opposing clips 20.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. In a basket construction, a U-shaped bail, an open eye integral with each parallel leg of the bail, a plate on each side of the basket on the inner side of the side wall, a loop integral with the plate and extending outwardly through the side wall for engagement with the eye to swingably mount the bail on the basket, and means formed with the plate above the loop for engagement with the bail to hold the bail in a fixed position relative to the basket.

2. In a basket construction, a U-shaped bail, an open eye integral with each parallel leg of the bail, a plate disposed one on each side of the basket on the interior thereof, a pair of outstanding arms formed with one end of the plate and disposed in spaced parallel relation to each other, and an elongated bracing member formed with the other end of the plate and having a looped intermediate portion extending outwardly through the side wall of the basket for engagement with the eye to swingably mount the bail on the basket.

3. In a basket construction, a U-shaped bail, an open eye integral with each parallel leg of the bail, a plate, a pair of outwardly extending bail engaging arms formed with the upper end of the plate and disposed in spaced relation to each other, said arms having outwardly convergent opposite edge portions, an elongated bracing member formed with the plate, a loop formed with the bracing member intermediate the ends thereof and extending outwardly through the side wall of the basket for engagement with the eye to pivotally mount the bail on the basket, and means formed with the upper end of the plate for engagement with a basket cover to hold the cover against movement on the upper end of the basket.

PETER K. MADISON.
RALPH D. SMITH.